United States Patent [19]

Burbank, III

[11] 4,281,537

[45] Aug. 4, 1981

[54] STRAIN METER

[75] Inventor: John E. Burbank, III, Ridgefield, Conn.

[73] Assignee: McNab, Incorporated, Mt. Vernon, N.Y.

[21] Appl. No.: 64,566

[22] Filed: Aug. 7, 1979

[51] Int. Cl.³ .............................................. G01L 3/10
[52] U.S. Cl. ............................................... 73/862.33
[58] Field of Search ......................... 73/136 A; 336/30

[56] References Cited

U.S. PATENT DOCUMENTS

| 2,949,029 | 8/1960 | Bayles et al. | 73/136 A |
|---|---|---|---|
| 3,229,514 | 1/1966 | Williams | 73/136 A |
| 3,537,304 | 11/1970 | Brewer | 73/136 A |

Primary Examiner—Donald O. Woodiel

Attorney, Agent, or Firm—Peck & Peck

[57] ABSTRACT

A strain meter includes first and second blocks clamped to a rotating shaft with a linear variable differential transformer (LVDT) rigidly affixed to the first block and a displacement arm rigidly affixed to the second block. A LVDT core is attached to one end of the displacement arm and disposed to be movable without contact through the center of the LVDT. A flexible cable is connected between the displacement arm and the LVDT to control the radial position of the LVDT core. A vertical stabilizing bar is connected between the blocks and includes a cutout section adjacent the second block to allow for necessary flexibility for the second block to follow shaft motion. Information signals generated by the LVDT are telemetered off the shaft to a receiver.

5 Claims, 2 Drawing Figures

U.S. Patent  Aug. 4, 1981  4,281,537
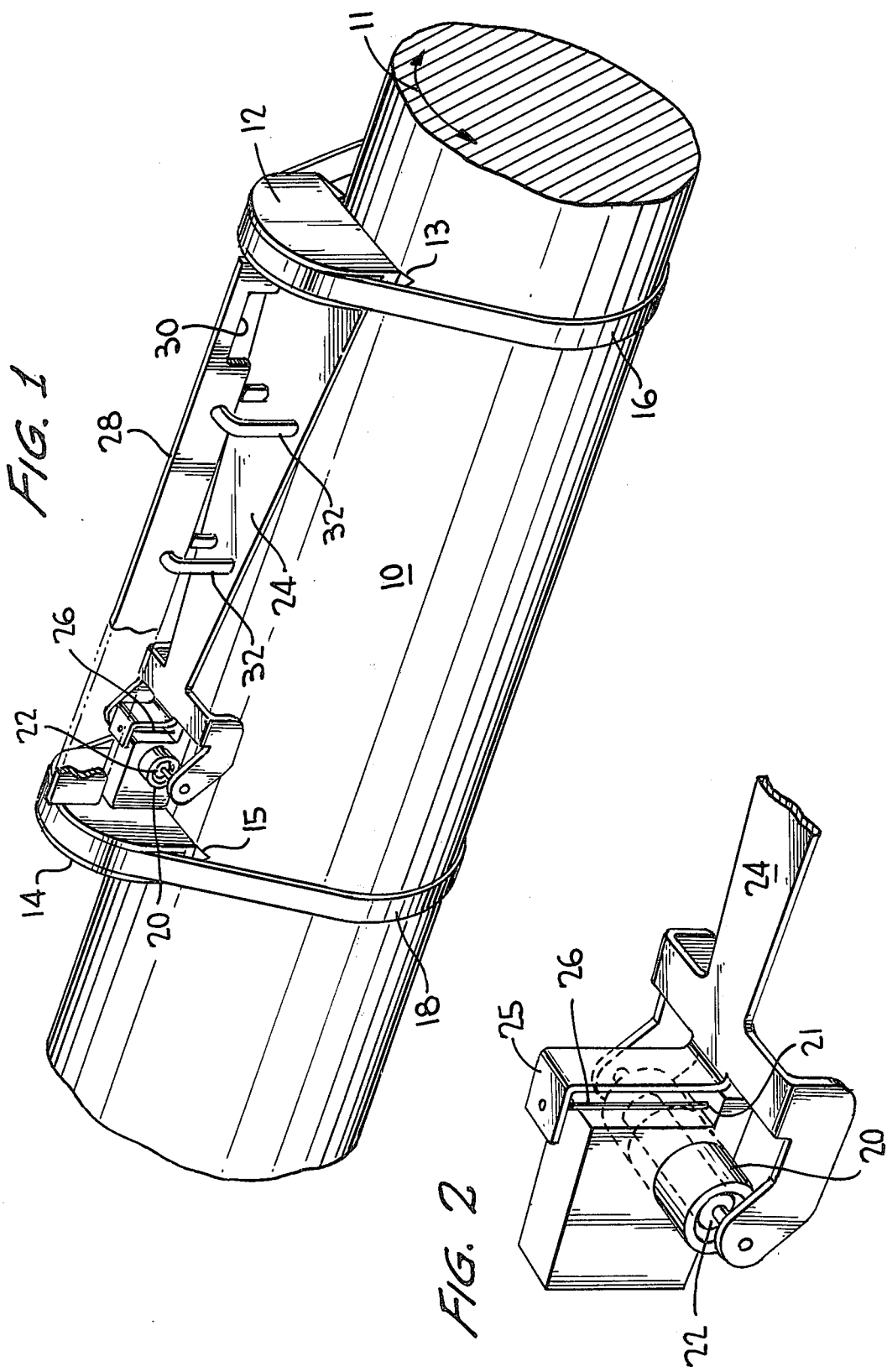

STRAIN METER

BACKGROUND AND SUMMARY OF THE INVENTION

The present invention relates to a novel apparatus for measuring strain in a rotating shaft and, more particularly, to a new and novel system for measuring strain experienced over a precise length of a rotating shaft.

Thus, a primary object of the present invention is to provide improved apparatus for measuring strain in a vibrating and/or rotating shaft.

A further important object of the present invention is to provide a strain meter which can be easily clamped onto shafts of different sizes and which is reliable and easily calibrated by determining shaft radius and effective operating radius of the linear variable differential transformer.

The present invention is summarized in that there is provided apparatus for measuring strain in a vibrating and/or rotating shaft. First and second spaced blocks are clamped to the shaft and rotate therewith. A linear variable differential transformer (LVDT) is affixed to the first block and a displacement arm is affixed to the second block. A LVDT core is attached to the displacement arm and disposed to be movable without contact within and through the LVDT. A flexible cable extends from the displacement arm to the LVDT and maintains the LVDT core at an adjustable radial position relative to the axis of rotation of the shaft. A vertical stabilizing bar is affixed to each block and includes a relief cutout section adjacent to the second block to accommodate the shaft flexure about its neutral axis. Oscillation dampers connect the displacement arm to the stabilizing bar. Shaft strain between the blocks is sensed at the LVDT and information signals indicative of the strain are telemetered off the shaft.

BRIEF DESCRIPTION OF THE DRAWINGS

FIG. 1 is a perspective view partially cut away of the present invention as it is assembled on a rotating shaft.

FIG. 2 is a perspective view partially cut away showing the LVDT, the displacement arm and the flexible cable.

DESCRIPTION OF THE PREFERRED EMBODIMENT

Referring now more particularly to FIGS. 1 and 2, the strain meter is illustrated to be assembled on a rotating shaft 10 to which is applied a stress or torque indicated at 11. A pair of spaced apart end blocks 12 and 14 are clamped onto shaft 10 by band clamps 16 and 18 so as to be rotatable with the shaft. A pair of meter points 13 on end block 12 and another pair of meter points 15 on end block 14 are made of hardened steel and such function to grip shaft 10 and maintain the end blocks in fixed relative position so that the distance between the end blocks is an accurately known and constant dimension due to the precision built into the the strain meter.

A linear variable differential transformer (LVDT) 20 is rigidly affixed to the end block 14 and includes a LVDT core 22. As is well known, a LVDT is a linear motion sensing transducer.

A strain or vibration displacement arm 24 is rigidly affixed to the end block 12 and lies substantially parallel to the axis of rotation of the shaft 10. The displacement arm 24 is designed to be flexible in a radial mode, i.e., in a direction vertical to the axis of rotation of the shaft 10, and to be very rigid in the tangential mode, i.e., in a direction tangential to the axis of rotation of the shaft 10.

The LVDT core 22 is mounted on the displacement arm 24 and disposed to be movable through the center of LVDT 20 without making physical contact therewith, as best illustrated in FIG. 2. This design allows the effective radius (relative to the shaft axis) of the LVDT core 22 to be adjusted (as described below) and yet the position of the core 22 through LVDT body 20 is positively controlled at all times by the displacement arm 24 which is rigidly affixed to only one end block 12 which is opposite the end block 14 to which LVDT 20 is rigidly affixed.

The displacement arm 24 is mounted with a spring preload or bias outwardly, i.e., radially, such that any motion which the end block 12 experiences will not cause the displacement arm 24 to become slack on the flexible cable 26 (described below). Under the condition of rotation, centrifugal force on the displacement arm will further contribute to this radial preload or bias.

As best illustrated in FIG. 2, a flexible cable or radial link 26 extends between displacement arm forwardly extending element 25 and the LVDT at 21. This flexible cable includes a zero backlash bearing and functions to control the radial position of LVDT core 22 relative to the axis of rotation of the shaft 10. The flexible cable 26 counterbalances the outwardly directed preload or bias of the strain or vibration displacement arm 24, and also exerts a centripetal force on displacement arm 24, thereby resisting any effects of acceleration thereof. The radial position of the LVDT core 22 relative to the axis of rotation of the shaft 10 is set by adjusting the length of radial link 26.

A vertical stabilizing bar 28 is rigidly affixed to the end blocks 12 and 14 and is positioned substantially parallel to the axis of rotation of the shaft 10. Stabilizing bar 28 is designed to be flexible in the tangential mode relative to shaft 10 and to be rigid in the radial mode. Stabilizing bar 28 functions to maintain end blocks 12 and 14 positioned upright and in planes normal to shaft 10. However, it must be noted that there are modes of shaft bending or strain where the longitudinal distance between the meter points 13 and 15 must change slightly to accommodate the shaft flexure about its neutral axis. To accommodate and compensate for this motion, the vertical stabilizing bar 28 has a relief cutout 30 adjacent or near the end block 12 to which the displacement arm 24 is rigidly affixed. The relief cutout 30 allows the necessary flexibility for the end block 12 to follow this shaft motion. The placing of the relief cutout 30 near the end block 12 causes the end block 14 to remain nearly vertical at all times such that the LVDT radial position is maintained accurately for all practical purposes. Thus, the vertical stabilizing bar 28 allows controlled relative motion between end blocks 12 and 14 about the shaft axis as the shaft twists.

In order to prevent any self-resonance which might otherwise occur, several oscillation damping elements 32, which are normally rubber, are positioned along the displacement arm 24 and connect the displacement arm 24 to the stabilizing bar 28.

In operation, strain or vibrations appearing on shaft 10 between the meter points becomes manifest through displacement of the arm 24 and, consequently, displacement of LVDT core 22 relative to the LVDT 20. This displacement is directly proportional to the stress applied to the shaft, the longitudinal distance between the meter points along the shaft, and the radial distance from the shaft center to the center of the LVDT core. The LVDT generates information signals which are indicative of strain or vibration and which are telemetered off the shaft.

It can thus be seen that a strain and vibration meter is disclosed which can be clamped on shafts of different sizes, which is reusable, and which is easily calibrated.

Obviously, many modifications and variations of the present invention are possible in the light of the above teachings. It is therefore to be understood that within the scope of the appended claims the invention may be practiced otherwise than as specifically described.

What is claimed is:

1. A system for measuring strain in a rotating shaft comprising:
   (a) first and second space blocks clamped onto said shaft and rotatable therewith;
   (b) a linear variable differential transformer (LVDT) rigidly affixed to said first block;
   (c) a displacement arm rigidly affixed to said second block and extending toward said LVDT and substantially parallel to the axis of rotation of said shaft;
   (d) a LVDT core mounted on said displacement arm and disposed to be movable through the center of said LVDT without contacting said LVDT, whereby strain occurring in said shaft between said blocks caused displacement of said LVDT core relative to said LVDT;
   (e) and further comprising a flexible cable connected between said displacement arm and said LVDT, whereby said flexible cable maintains the radial position of said LVDT core relative to the axis of rotation of said shaft.

2. A system for measuring strain in accordance with claim 1, and further comprising a stabilizing bar rigidly affixed to each said block and substantially parallel to the axis of rotation of said shaft.

3. A system for measuring strain in accordance with claim 2, wherein said stabilizing bar comprises a bar having a cutout section adjacent said second block, whereby said cutout section functions to allow said blocks to follow said shaft motion while maintaining upright relative to said shaft.

4. A system for measuring strain in accordance with claim 2, and further comprising oscillation damper means connecting said displacement arm to said stabilizing bar, whereby said oscillation means prevent self-resonance in the system.

5. A system for measuring strain in accordance with claim 2, and further comprising spring bias means for causing a radially outward force to be exerted on said displacement arm, whereby motion of said second block will not cause said displacement arm to become slack on said flexible cable.

* * * * *